June 20, 1939.  R. A. NORBOM  2,162,743
VALVE
Filed April 13, 1937
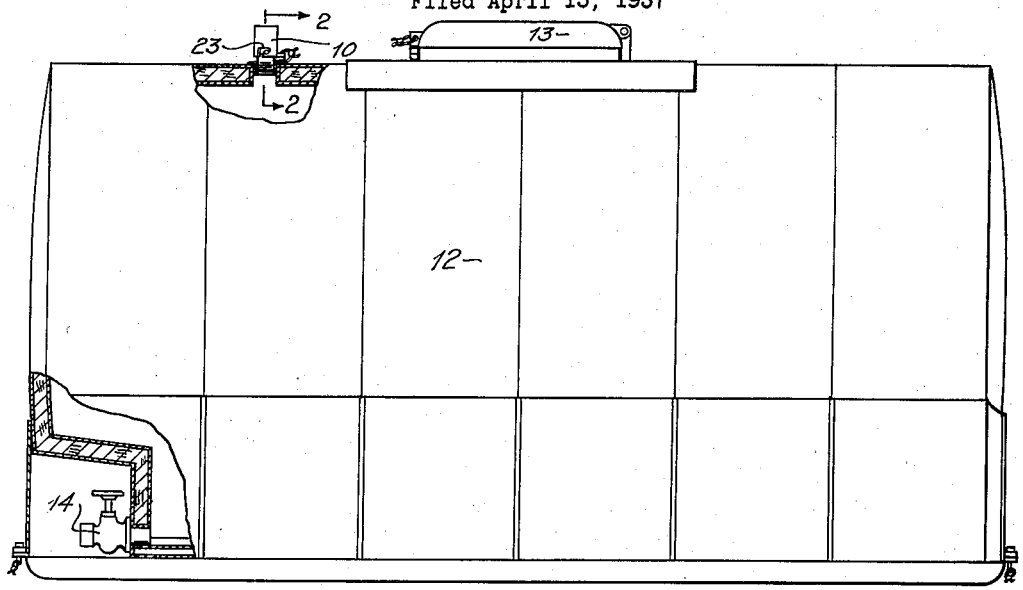
FIG. 1
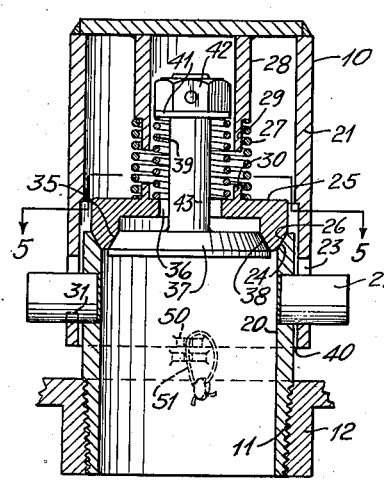
FIG. 2
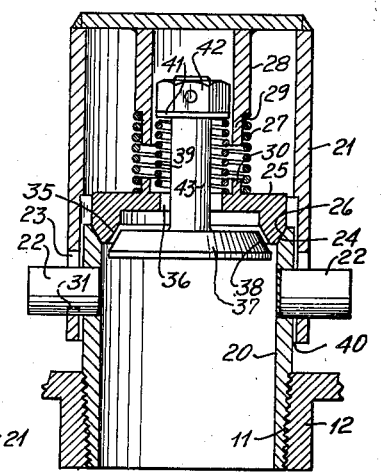
FIG. 3
FIG. 4
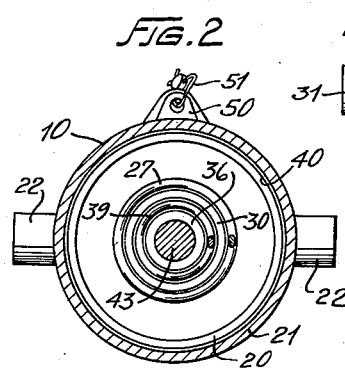
FIG. 5
INVENTOR.
Ragnar A. Norbom.
BY Bates, Goldrick & Teare
ATTORNEYS.

Patented June 20, 1939

2,162,743

UNITED STATES PATENT OFFICE 2,162,743

VALVE

Ragnar A. Norbom, Clifton, N. J., assignor to Motor Terminals, Inc., Cleveland, Ohio, a corporation of Ohio Application April 13, 1937, Serial No. 136,559

2 Claims. (Cl. 277—45)

This invention relates to a pressure relief valve, and especially to a pressure relief valve for automatically maintaining atmospheric or substantially atmospheric pressure in tanks or liquid containers, such as milk tanks and the like.

The general object of the present invention is to provide a unitary pressure relief valve, especially adapted for use with liquid containers, and which will relieve both positive and negative pressures, to thereby maintain the pressure within a tank substantially equal to the external pressure, regardless of temperature or other changes in the condition of the material stored in the tank.

A further object is to provide an improved unitary pressure relief valve, so arranged as to relieve the tank of both positive and negative pressures, and in which the valve members are readily separable and when separated will be free to enable them to be thoroughly cleansed before replacement, thus enabling the valve structure to be used in tanks containing milk and other similar materials, where, by making the entire valve structure readily accessible for cleansing, the highest degree of sanitation possible is maintained.

Other objects of the present invention will become more apparent from the following description, reference being had to the accompanying drawing, in which I illustrate a preferred embodiment of my invention. The essential features of the invention will be summarized in the claims.

In the drawing, Fig. 1 is a side elevation of a demountable tank body embodying my invention, the tank being of the type adapted to be transferred between railway and automotive vehicles, to transport milk from place to place; Fig. 2 is a vertical section through my improved valve mechanism, as indicated by the line 2—2 on Fig. 1, the scale of the figure being considerably greater than the scale of Fig. 1; Figs. 3 and 4 are views similar to Fig. 2, but illustrating the valve under different operating conditions, Fig. 3 illustrating the position of the valve members when the valve is in operation to relieve a reduced pressure, while Fig. 4 illustrates the relative position of the valve parts when the valve is relieving an excess pressure; Fig. 5 is a substantially horizontal section through the valve, the plane of the section being indicated by the offset lines of 5—5 on Fig. 2.

In Fig. 1 I have illustrated my improved valve structure 10, as being mounted by a suitable threaded connection 11 in the upper wall of a tank 12. The tank is provided with inlet and outlet openings 13 and 14, respectively, and reference is made to the copending application of Benjamin F. Fitch, Serial No. 92,984, filed July 28, 1936, and assigned to my assignee, Motor Terminals Company, for a more complete description of a tank structure per se. However, the valve with which this invention is concerned is not restricted in its application to any specific tank structure.

The valve structure with which the present invention is concerned, is best illustrated in Figs. 2 to 5, inclusive. As there shown, the valve comprises a base 20, a removable cap 21, together with suitable valve members which are retained in position on the base by the removable cap 21. As illustrated, the base 20 of the valve comprises a metallic tube provided, adjacent its lower end, with external threads 11, heretofore mentioned, and which are adapted to coact with a suitable threaded opening provided in the tank body 12.

The cap 21 is removably and telescopically connected to the base and is of such internal diameter that its inner wall is spaced from the outer wall of the base, as indicated at 40 in Fig. 2. Secured to the wall of the base 20, slightly below its upper end, and extending radially outward therefrom, are a pair of pins 22, arranged to coact with respective slotted openings 23 in the cap, forming a bayonet lock connection between the cap and the base.

One valve seat is formed on the upper surface of the base 20. As shown, the upper surface ot the base 20 is tapered downwardly and inwardly, providing an upwardly facing conical valve seat 24, which is normally closed by a valve closure member 25, having a complementary conical surface 26. This valve closure member is normally retained against the seat 24 by a compression spring 27. The spring 27 is interposed between the upper surface of the valve member 25 and a downwardly extending sleeve or guide 28, which adjacent its upper end is secured to the top of the closure member 21, as by welding. The sleeve 28 and the valve member 25 are provided with annular flange formations 29 and 30, which guide and maintain the spring 27 in position.

The spring 27 not only retains the valve member 25 against its seat 24, but also retains the depressed portions 31 of the bayonet lock slot 23, in contact with the pins 22 of the base, thus maintaining the cap in position on the base.

The valve structure just described is shown in operation in Fig. 4. In this figure the pressure within the tank has exceeded the external atmospheric pressure, forcing the valve member 25 from its seat, thereby permitting such excess pressure to escape through the hollow base 20 into the cap 21 and thence between the cap 21 and the base 20 to exterior of the tank and valve.

To relieve the tank of a negative pressure or to break a partial vacuum in the tank, I provide the valve member 25 with the downwardly facing conical seat 35, and extend an opening 36 axially through such valve member. This opening is normally closed by a second valve member 37, which is provided with an upwardly facing conical surface 38 to coact with the seat 35. The valve member 37 is provided with a stem 43 which extends upwardly through the opening 36 in the valve member 25. The valve member 37 is normally retained against its seat 35 by a compression spring 39. This spring 39 encircles the stem 43 and is interposed between the upper surface of the valve member 25, and a shoulder on the stem 43 formed, for instance, by a washer 41 which is retained in position by a nut 42. A suitable locking pin may pass through the nut 42 and the stem 43 to thereby lock the nut in position.

When the pressure within the tank is decreased, or a partial vacuum created, the external pressure forces the valve member 37 downwardly away from its seat, permitting air to pass into the tank from the exterior thereof, through the space 40 between the inner walls of the cap and the external walls of the base, and the opening 36 in the valve member 25, which opening is considerably larger than the stem 32, as illustrated in the drawings.

If desired, I may provide the cap 21 and the base 20 with respective ears 50, which are adapted to register one with the other when the cap is in position on the base. A car seal 51, or other suitable locking device, may then be passed through preformed openings in these ears, to prevent tampering with the valve or with the contents of the tank.

As a practical arrangement for 1¼" and 1½" diameter valves on a tank of the proportions illustrated, I propose to use springs such as 27 and 39 of equal effective pressure when the valves are closed; (for example, in the neighborhood of two pounds pressure) so that a comparatively slight differential between the inside and outside of the tank will operate one or the other of the valves.

From the foregoing it is to be noted that I have provided a very simple valve structure, readily manufactured, and requiring a minimum number of parts. By combining the positive pressure relief valve with the negative pressure relief valve, only one mounting on the tank is required.

It will also be noted that due to the compact construction, my improved valve is no larger than ordinarily required for a valve which acts solely as a positive pressure relief valve, or one which acts solely as a negative pressure relief valve.

Likewise, the construction of my improved valve is such that it may be readily cleaned. For instance, it will be noted that upon removal of the cap 21, the entire mounted valve assembly may be removed, both from the cap and the base, and as neither the base nor cap have tortuous passageways, they likewise are accessible for cleansing, thereby providing a pressure relief valve for use in connection with milk tanks and the like, which valve permits the maintenance of an extremely sanitary condition of the equipment used. Likewise, the cap, when in position on the base, serves as a dust cap, preventing foreign materials from entering the valve.

I claim:

1. A valve member comprising a base adapted to be arranged and secured to a tank, and having an opening therethrough arranged to communicate with the interior of the tank, a cap closed at one end and adapted to telescopically encircle the base in a spaced relation therefrom, a bayonet lock connection between the cap and the base, a valve member adapted to close the opening in the passageway in the base, a compression spring extending between said valve member and the cap, whereby said spring coacts to normally maintain the passageway in the base closed and to retain the cap in position on the base, said valve member having an axially extending opening therethrough, a second valve member adapted to be arranged to close the opening in the first-named valve member, and having a stem extending upwardly therethrough and resilient means associated with said stem to cause said second-named valve to maintain the opening in the first-named valve member normally closed.

2. A valve member comprising a base adapted to be arranged and secured to a tank and having an opening therethrough arranged to communicate with the exterior and the interior of the tank, an enclosed cap adapted to telescopically encircle the base, having its outer wall spaced apart from the outer walls of the base, a bayonet lock connection, between the cap and the base, a valve member adapted to close the opening in the passageway in the base, a compression spring extending between said valve member and the cap, whereby said spring acts to normally maintain the passageway in the base closed and to retain the cap in position on the base, said valve member having an axially extending opening therethrough, a second valve member adapted to be arranged to close the opening in the first-named valve member and having a stem extending upwardly through such opening, said stem being provided with an enlarged head, a compression spring disposed between said head and the first-named valve member, and acting normally to maintain the opening in the first-named valve member closed.

RAGNAR A. NORBOM.